US009557431B2

(12) United States Patent
Pennec et al.

(10) Patent No.: US 9,557,431 B2
(45) Date of Patent: *Jan. 31, 2017

(54) DIGITAL SEISMIC SENSOR AND ACQUISITION DEVICE ADAPTED TO BE CONNECTED TOGETHER VIA A TWO-CONDUCTOR LINE

(71) Applicant: SERCEL, Carquefou (FR)

(72) Inventors: Daniel Pennec, Suce sur Erdre (FR); Jerome Laine, Sautron (FR); Jacques Hamon, Nantes (FR)

(73) Assignee: SERCEL, Carquefou (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/878,023

(22) Filed: Oct. 8, 2015

(65) Prior Publication Data

US 2016/0025876 A1 Jan. 28, 2016

Related U.S. Application Data

(63) Continuation of application No. 13/921,827, filed on Jun. 19, 2013, now Pat. No. 9,304,218.

(30) Foreign Application Priority Data

Jun. 19, 2012 (EP) .................................... 12172569

(51) Int. Cl.
*G01V 1/20* (2006.01)
*G01V 1/22* (2006.01)
*G01V 1/38* (2006.01)

(52) U.S. Cl.
CPC . *G01V 1/22* (2013.01); *G01V 1/20* (2013.01); *G01V 1/3808* (2013.01)

(58) Field of Classification Search
CPC ............ G01V 1/22; G01V 1/3808; G01V 1/20
See application file for complete search history.

(56) References Cited

U.S. PATENT DOCUMENTS 7,548,600 B2    6/2009  Laine et al.
2002/0063588 A1 5/2002  Page et al.
(Continued)

FOREIGN PATENT DOCUMENTS

CN    1324550 C    7/2007
CN  101855938 A   10/2010

OTHER PUBLICATIONS

European Search Report dated Feb. 14, 2013, for corresponding European Application No. 12172569, (filed Jun. 19, 2012), 11 pgs.

(Continued)

*Primary Examiner* — Luke Ratcliffe
*Assistant Examiner* — Hovhannes Baghdasaryan
(74) *Attorney, Agent, or Firm* — Patent Portfolio Builders PLLC

(57) ABSTRACT

A digital seismic sensor adapted to be connected, via a two-conductor line, to an acquisition device. The digital seismic sensor includes: a digital sensor; a local sampling clock providing a sampling frequency; a receiver for receiving command data coming from the acquisition device and synchronization information providing accurate timing information to enable seismic sensor synchronization; a compensator for compensating, as a function of the synchronization information, a drift of the local sampling clock; a transmitter for transmitting seismic data towards the acquisition device; a driver for driving the receiver and the transmitter, according to a half-duplex transmission protocol over the two-conductor line and using a transmission clock extracted from the received command data; a power receiver for receiving electrical power; and a coupler for coupling the command and synchronization information receiver, the transmitter and the power receiver to the two-conductor line.

18 Claims, 6 Drawing Sheets

(56) References Cited

U.S. PATENT DOCUMENTS

| | | |
|---|---|---|
| 2002/0126574 A1 | 9/2002 | Downey, Jr. et al. |
| 2002/0193947 A1 | 12/2002 | Chamberlain |
| 2003/0117025 A1 | 6/2003 | Rouquette |
| 2004/0006430 A1 | 1/2004 | Harmon et al. |
| 2004/0066147 A1 | 4/2004 | Park et al. |
| 2010/0017139 A1 | 1/2010 | Adams et al. |
| 2010/0302902 A1 | 12/2010 | Nance et al. |
| 2011/0317517 A1 | 12/2011 | Borresen et al. |
| 2012/0256175 A1 | 10/2012 | Rinzler et al. |

OTHER PUBLICATIONS

First Office Action in related Chinese Patent Application No. 201310241444.X, dated Dec. 14, 2015.

DIGITAL SEISMIC SENSOR AND ACQUISITION DEVICE ADAPTED TO BE CONNECTED TOGETHER VIA A TWO-CONDUCTOR LINE

1. CROSS-REFERENCE TO RELATED APPLICATIONS

This application is a continuation of U.S. application Ser. No. 13/921,827 filed on Jun. 19, 2013, which claims the benefit of EP Patent Application No. 12172569.1 filed on Jun. 19, 2012, the contents of which are hereby incorporated by reference in their entirety.

2. STATEMENT REGARDING FEDERALLY SPONSORED RESEARCH OR DEVELOPMENT

None.

3. THE NAMES OF PARTIES TO A JOINT RESEARCH AGREEMENT

None.

4. FIELD OF THE INVENTION

The field of the invention is that of seismic data acquisition. More specifically, particular embodiments of the invention relate to a digital seismic sensor and an acquisition device adapted to be connected together via a two conductor line. A particular application of the invention relates to land seismic data acquisition systems.

These embodiments of the invention can be applied in particular in the industry of oil exploration by seismic method, but may be applied to any field implementing a seismic data acquisition.

5. TECHNOLOGICAL BACKGROUND

Seismic data acquisition systems conventionally use cabled networks comprising electronic units whereto ground movement sensors are connected.

FIG. 1 illustrates schematically a seismic data acquisition system according to a first known solution, based on the use of analog sensors 4.

For the sake of simplification, each reference 4 designates an analog sensor and its corresponding housing and casing (as detailed below with FIG. 6).

To collect the seismic data (geophysical data), one or a plurality of seismic sources (not shown in FIG. 1) in contact with the ground are activated to propagate omni-directional seismic wave trains. The sources may among other things consist of explosives, falling weights, vibrators or air guns in marine environments. The wave trains reflected by the layers of the subsurface are detected by the analog sensors 4, which generate an analog signal characterising the reflection of the waves on the geological interfaces of the subsurface.

The analog sensors 4 are generally referred to using the term "analog geophones". As shown in FIG. 6, they are generally interconnected in groups of sensors by a two-conductor line 5 (or a three-conductor line for a serial-parallel configuration) to form clusters referred to as "strings of analog geophones". To this end, each analog geophone is mounted in a mechanical housing (or cartridge) 62. This mechanical housing 62 of analog sensor is inserted with mechanical tolerances inside a casing 61 (made of plastic in general) which shape is dependent of the type of area to investigate (marsh, land . . . ). The two-conductor line 5 is usually moulded to the casing 61.

Each of the strings is connected to an acquisition device 3 (several strings can be connected to the same acquisition device). To this end, the acquisition device is also mounted in a mechanical housing which comprises a connector 63 with two contacts, adapted to cooperate with a connector 64 of the same type placed on the two-conductor line 5 (i.e. the cable of the string).

A string of analog geophones allows to filter the noise (spatial filtering), since the analog information circulating on the two-conductor line 5 (towards the acquisition device 3) is the average of measurements made by each of the analog geophones.

The acquisition devices 3 are generally referred to using the term "Digitizer Unit". They are interconnected by a cabled network (e.g. a four-conductor line), perform the analog to digital conversion of analog signals coming from the groups of sensors and send the resulting digital seismic data to a central recording system 1 (also referred to using the term "central data processing unit"), via intermediate collection devices 2 (also referred to using the term "concentrator device"). The central recording system 1 is usually onboard a recording truck.

The acquisition devices 3 also performs other functions, notably: synchronisation with the central recording system 1, processing of the seismic signal and interfacing with the digital network (i.e. transferring seismic data to the central recording system 1, receiving and processing commands received from the central recording system 1).

FIG. 2 illustrates schematically a seismic data acquisition system according to a second known solution, based on the use of digital sensors 20. Identical elements are designated by the same numerical reference sign.

The digital sensors 20 are generally referred to using the term "Digital Unit". Each digital unit includes a sensor which is a micro-machined accelerometer (also referred to using the term "MEMS-based accelerometer". MEMS being the acronym for "Micro-Electro-Mechanical System").

Comparing with FIG. 1, each digital unit replaces an acquisition device 3 and the string or strings of analog sensors 4 connected to it via a two-conductor line 5. As the acquisition devices 3 of FIG. 1, the digital units 20 are interconnected by a cabled network (e.g. a four-conductor line) and send the digital seismic data to a central recording system 1, via intermediate collection devices 2.

In a known alternative embodiment, the acquisition device 3 or the digital sensors 20 use a wireless network to communicate with the intermediate collection devices 2 and/or the central recording system 1.

In another known alternative embodiment, the acquisition device 3 or the digital sensors 20 use have a memory sufficient for a later seismic data harvesting.

The digital sensors offer advantages over analog sensors (particularly in terms of bandwidth and sensibility stability). However, the solution of FIG. 2 is not optimal if one wishes to make an acquisition with a high number of digital sensors (for example a thousand digital sensors, and thus a thousand digital units 20) by acquisition line (each acquisition line being connected to an intermediate collection devices 2). Indeed, in this case, all the digital units of an acquisition line are connected in series, which requires a robustness of each digital unit (in quality design and manufacturing, which is expensive).

In addition, the solution of FIG. 2 can not have multiple-sensor strings on a same acquisition line (as opposed to the solution of FIG. 1, with strings of analog geophones). However, there are advantages to use a string of digital geophones, notably:

a higher fidelity and stability of measures; and a string of analog geophones gives a measure which is the average of the measurements, while a string of N digital geophones gives N measures. The access to these N measures allows for a spatial filter (combination of the N measures) more effective.

At least for these reasons, and for cost reasons, the inventors have come to the conclusion that it would be interesting to implement strings of digital sensors, using the well-proven string technique comprising a two-conductor line 5 (i.e. the cable of the string) and associated connectors 63, 64, casing 61 and housing 62 (see FIG. 6).

In a particular embodiment, the proposed solution should also allow to connect only one digital sensor to the acquisition device, via a two-conductor line (i.e. a connection according to a bus topology, also referred to as a branch topolgy).

Unfortunately, there is currently no solution as discussed above, combining the concepts of string and digital sensor. In other words, it is not possible today to use the existing cable (two-conductor line 5) of the strings by replacing, in mechanical housing (or cartridge) 62 of analog sensors, these analog sensors by digital sensors.

As explained above, this mechanical housing 62 of analog sensors is inserted with mechanical tolerances inside a casing 61 (made of plastic in general) which shape is dependent of the type of area to investigate (marsh, land . . . ).

It must be noted that it is was not obvious for the Man skilled in the art, at the time the present invention was made, to fins a technical solution allowing to connect one or several digital sensors and an acquisition device together, using a two-conductor line usually used to connect one or several analog sensors, which further is a poor quality cable.

Indeed, currently, a given digital unit is connected to another digital unit, via a two pairs line cable, which is a good qualify (and therefore expensive) cable, by which:

the given digital unit receives electrical power (from mid-point of both pairs), used in particular by the digital sensor (MEMS-based accelerometer) included in the given digital unit;

the two pairs are connected to digital unit and are used in full-duplex mode: one pair as input for commands and synchronization (sampling clock); one pair as output for seismic data obtained by the digital sensor (MEMS-based accelerometer for example) included in the given digital unit (these seismic data being intended ultimately to the central recording system 1);

the given digital unit receives a sampling clock (common to tall digital sensors included in the various digital units), used by the digital sensor (MEMS-based accelerometer) included in the given digital unit. The original sampling clock is a high-precision clock (such as a quartz oscillator) contained in the central recording system 1. The digital units are frequency-dependent by means of a low phase noise analog phase lock loop (PLL) that extracts the sampling clock from the data. Low phase noise is mandatory to achieve accelerometer ultra low noise specifications. To achieve low phase noise with such a PLL, it is mandatory to always have data on the input pair hence to be in fall duplex mode. Indeed, periods with no data fed into PLL would lead to PLL drift and phase noise. That's the reason why using such a PLL imposes the use of two pairs.

the given digital unit sends at least quality control data or seismic data obtained by the digital sensor (MEMS-based accelerometer) included in the given digital unit (these seismic data or quality control data being intended ultimately to the central recording system 1);

the given digital unit receives command data (that the central recording system 1 sends to the given digital unit).

It is important to note that the Man skilled in the art is faced with the following dilemma: the digital sensor should receive the sampling clock via a poor quality (low cost) standard geophone cable (i.e a two-conductor line). But in the facts, this is impossible. Indeed, the noise on the line does not allow it. More precisely, the phase jitter of the data, and hence of the sampling clock after recovery by the PLL, on this cable would be too high. In other words, attenuation and distortion induced by such a cable degrade the temporal precision of a clock that would be transmitted on that cable. Moreover such a cable gets ("picks up") the ambient electronic noise that would degrade even more this clock.

The Man skilled in the art is faced with another problem: the use of a phase lock loop (PLL), in order to recover the sampling clock coming from the central recording system 1, induces a size which is not compatible with a desired objective of placing the digital sensor in a housing containing usually an analog sensor.

The use of a PLL also induces a great power consumption which is not compatible with a desired objective to reduce the power consumption of the acquisition device.

Thus, the Man skilled in the art has therefore no incentive to pursue the course of trying to combine the concepts of sensor string and digital sensors.

6. SUMMARY OF THE INVENTION

A particular embodiment of the invention proposes a seismic sensor adapted to be connected, via a two-conductor line, to as acquisition device which acquires seismic data provided by the seismic sensor and transmits said seismic data to a central recording system or to an intermediate collection device. Said seismic sensor is a digital seismic sensor comprising:

a digital sensing mean providing said seismic data;

a local sampling clock providing a sampling frequency to said digital sensing mean;

means for receiving, via said two-conductor line, synchronization information providing accurate timing information to enable seismic sensor synchronization;

means for compensating, as a function of said synchronization information, a drift of said local sampling clock;

means for receiving command data coming from the acquisition device, via said two-conductor line;

means for transmitting seismic data towards the acquisition device, via said two-conductor line;

means for driving said means for receiving command data and said means for transmitting seismic data, according to a half-duplex transmission protocol over said two-conductor line and using a transmission clock extracted from the received command data;

means for receiving electrical power over said two-conductor line; and means for coupling said means for receiving command data, said means for transmitting seismic data and said means for receiving electrical power to said two-conductor line.

This particular embodiment relies on a wholly novel and inventive approach, combining several features:

- multiplexing seismic data transmission, command data reception and electrical power on a same two-conductor line. This allows the use of a two-conductor line between the digital seismic sensor and the acquisition device; and
- using a local sampling clock, whose drift is compensated as a function of received synchronization information. In other words, we get rid of high performance PLL that extracts the sampling clock from data. Indeed we separate (distinguish) the sampling clock, used by the digital sensing mean (e.g. MEMS-based accelerometer), and the transmission clock, used by the means for receiving and transmitting. This allows to use standard low cost/low quality geophone cable (not being designed to transmit high frequency digital data but low frequency analog data), and to use half-duplex mode on a single pair cable.

According to a particular feature, said means for coupling are suitable for a connection to said two-conductor line according to a bus topology.

Thus several digital seismic sensors according to an embodiment of the invention can be connected to a same two-conductor line according to a bits topology (i.e. a branch topology). In other words, this allows to implement a string of digital seismic sensors, which is connected to the two-conductor line. See above the advantages to use such a string of digital sensors.

According to a particular feature, said digital sensing mean comprises an analog/digital converter sampling data at the sampling frequency provided by said local sampling clock, thus providing a series of sampled and dated seismic data having a time provided by the local sampling clock. Said means for compensating a drift of said local sampling clock comprise;

- a time-keeping module for measuring a frequency error of the local sampling clock, the time-keeping module being able to gauge the local sampling clock to the synchronization information; and
- a resampling module for correcting the sampled and dated seismic data, as a function of the measured frequency error.

According to a particular feature, the seismic sensor is integrated in a "standard analog geophone" like mechanical housing.

This allows to use a well-proven mechanical housing technique, for the digital sensor.

According to a particular feature, the seismic sensor comprises a all digital delay locked loop, extracting the transmission clock front the received command data.

An ADDLL has the same function as PLL but produces a clock with a high phase noise not compatible with the MEMS-based accelerometer noise specifications.

The fact that, according to the particular embodiment of the invention, the local sampling clock and the transmission clock are dissociated allows to use an ADDLL which has many advantages:

- the ADDLL allows to save board space (it has almost a zero size) and is cheaper (it has almost a zero cost) because it is integrated in a CPU included in the digital sensor (this is hardly the case with a PLL);
- there is no learning phase. In the case of a full-duplex transmission on a two-conductor line, the use of a PLL is acceptable because there is a learning phase (which may take of the order of 200 ms) only once at power up. With a two-conductor line used in half-duplex, the learning phase would take place in each message (at each reversal of direction of communication), which would encumber the bandwidth.

According to a particular feature, said digital sensing mean belongs to the group comprising: MEMS-based accelerometers, MEMS-based velocimeters and analog geophones integrated with an analog/digital converter.

According to a particular feature, said digital sensing mean is a single component sensor.

Thus the compactness of the seismic digital sensor is further improved.

According to an alternative embodiment, said digital sensing mean is a three-component sensor.

Another particular embodiment of the invention proposes a string of seismic sensors comprising a plurality of seismic sensors connected to a two-conductor line, said two-conductor line being adapted to be connected to an acquisition device which acquires seismic data provided by said plurality of seismic sensors and transmits said seismic data to a central recording system, or to an intermediate collection device. Each of said seismic sensor is a seismic sensor according to any one of the above embodiments.

Another particular embodiment of the invention proposes an acquisition device adapted to be connected, via a two-conductor line, to at least one seismic sensor, said acquisition device comprising means for acquiring seismic data provided by the at least one seismic sensor and means for transmitting said seismic data to a central recording system or to an intermediate collection device. The acquisition device comprises:

- means for transmitting, via said two-conductor line, synchronization information providing accurate timing information to enable seismic sensor synchronization.
- means for transmitting, via said two-conductor line, command data towards the at least one digital seismic-sensor;
- means for receiving, via said two-conductor line, digital seismic data coming from said at least one digital seismic sensor;
- means for driving said means for receiving digital seismic data and said means for transmitting command data, according to a half-duplex transmission protocol over said two-conductor line and using a transmission clock obtained from a local clock and said seismic data;
- means for transmitting electrical power over said two-conductor line; and
- means for coupling said means for receiving digital seismic data, said means for transmitting command data and said means for transmitting electrical power to said two-conductor line.

The proposed acquisition device is adapted to cooperate (via a two-conductor line) with one or a siring of several new digital seismic sensors as presented above.

According to a particular feature, the acquisition device comprises an analog/digital converter, switching means and means for enabling/disabling such that, if said at least one seismic sensor is of a digital type:

- said switching means directs digital seismic data coming from the at least one seismic sensor towards the means for coupling;
- said analog/digital converter is disabled;
- said means for transmitting command are enabled;
- said means for driving are enabled for driving said means for receiving seismic data and said means for transmitting command data, according to said half-duplex transmission protocol over said two-conductor line and using said transmission clock;

said means for transmitting electrical power are enabled.

According to a particular feature, said means for enabling/disabling are such that, if said at least one seismic sensor is of an analog type:
- said switching means direct the analog seismic data coming from the at least one seismic sensor towards the analog/digital converter;
- said analog/digital converter is enabled, to convert the analog seismic data into digital seismic data;
- said means for transmitting command are disabled;
- said means for transmitting electrical power are disabled;

Thus, the same acquisition device can be used wither with one or a string of several classical analog seismic sensors, or with one or a string of several new digital seismic sensors.

According to a particular feature, the acquisition device comprises means for automatically detecting whether at least one seismic sensor has been connected to the acquisition device via the two-conductor line, and means for automatically determine the type, analog or digital, of the at least one seismic sensor connected to the acquisition device.

According to a particular feature, the acquisition device is integrated in a "standard acquisition device dedicated to analog sensors" like mechanical housing comprising a connector with two contacts, adapted to cooperate with a connector of the same type placed on the two-conductor line.

This allows to use a well-proven mechanical housing technique, for the acquisition device.

According to a particular feature, the acquisition device comprises a all digital delay locked loop, extracting a transmission clock from the received seismic data.

The advantages of using a ADDLL in the acquisition device are the same as those already discussed above for the digital seismic sensor.

7. LIST OF FIGURES

Other features and advantages of embodiments of the invention shall appear from the following description, given by way of indicative and non-exhaustive examples and from the appended drawings, of which:

Figure 3:
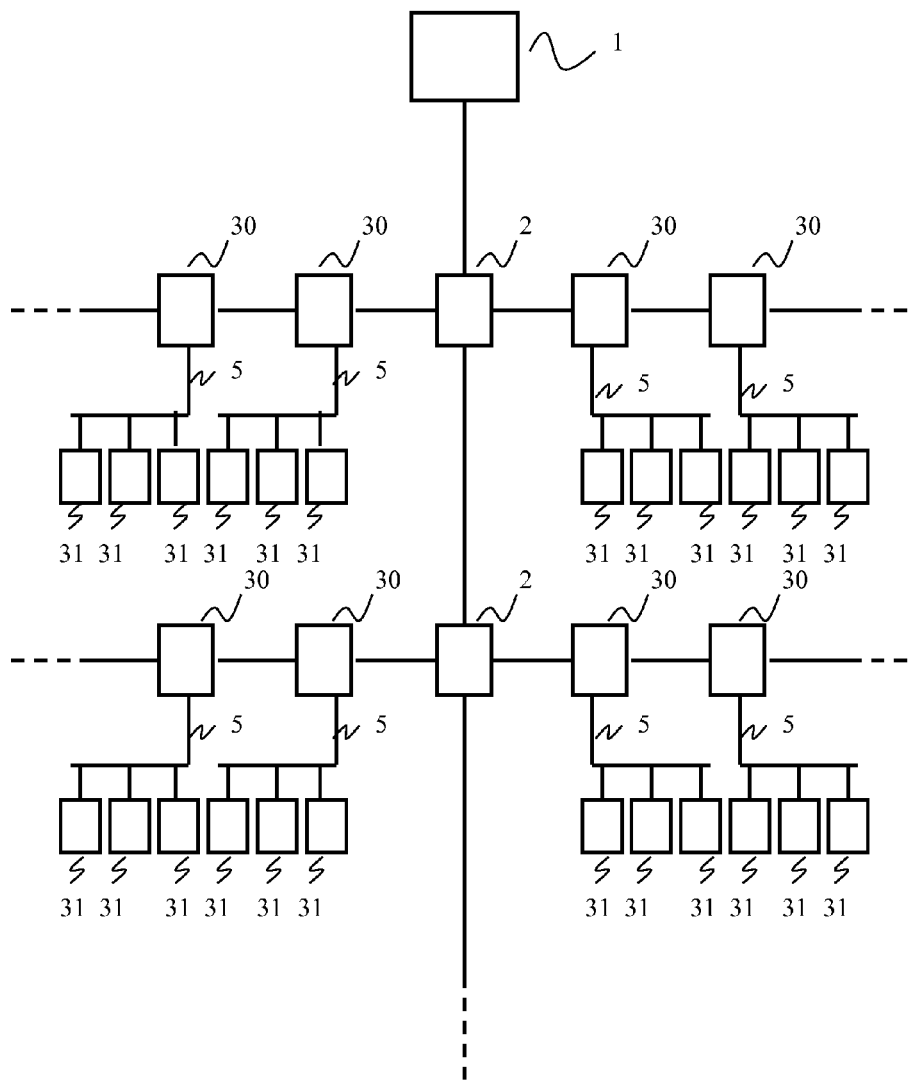
FIG. 3 illustrates schematically a seismic data acquisition system according to a particular embodiment of the invention.
Figure 4:
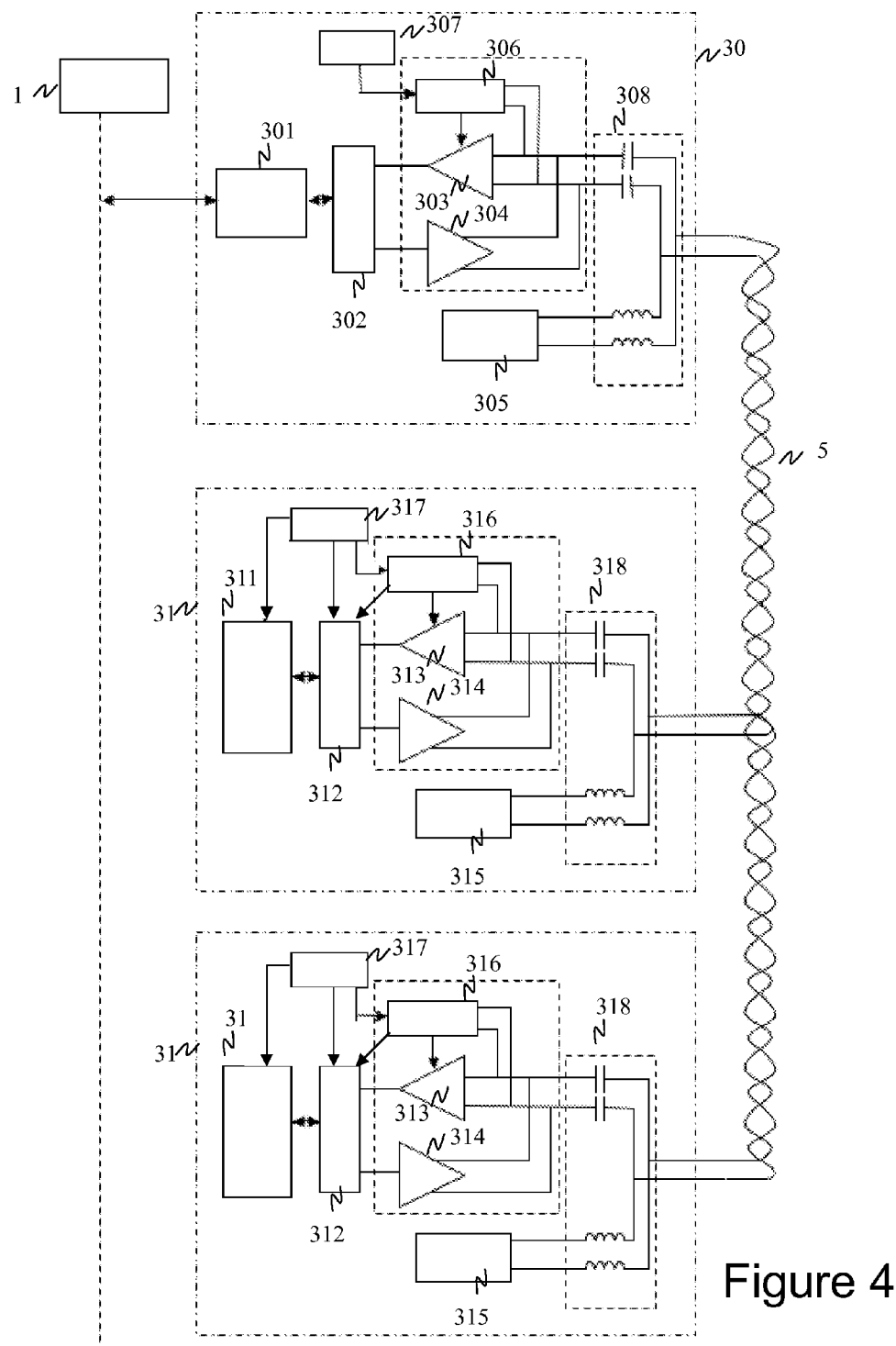
Figure 5:
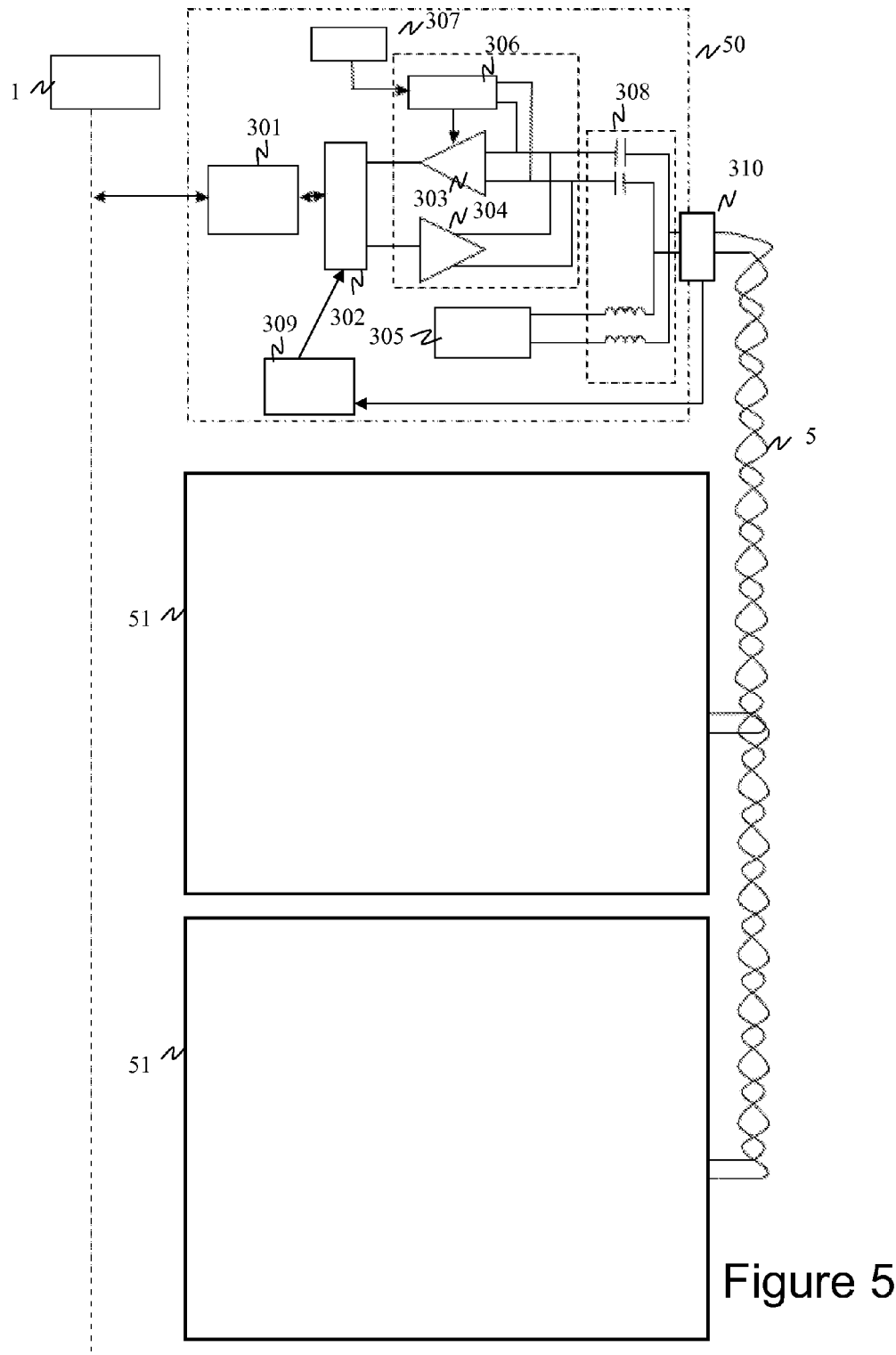
Figure 6:
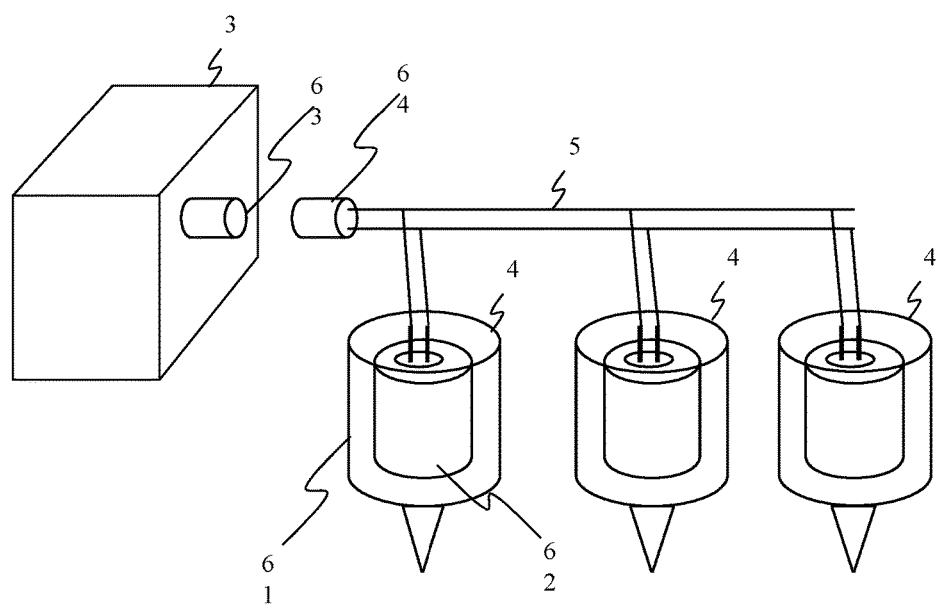

FIG. 4 details a string appearing in FIG. 3 and comprising two digital sensors connected to an acquisition device;

FIG. 5 details an alternative embodiment of the acquisition device, to which can be connected either a string of digital sensors, or a string of analog sensors;

FIG. 6 illustrates schematically a string of analog geophones according to the prior art.

8. DETAILED DESCRIPTION

In all of the figures of the present document, identical elements and steps are designated by the same numerical reference sign.

Figure 1:
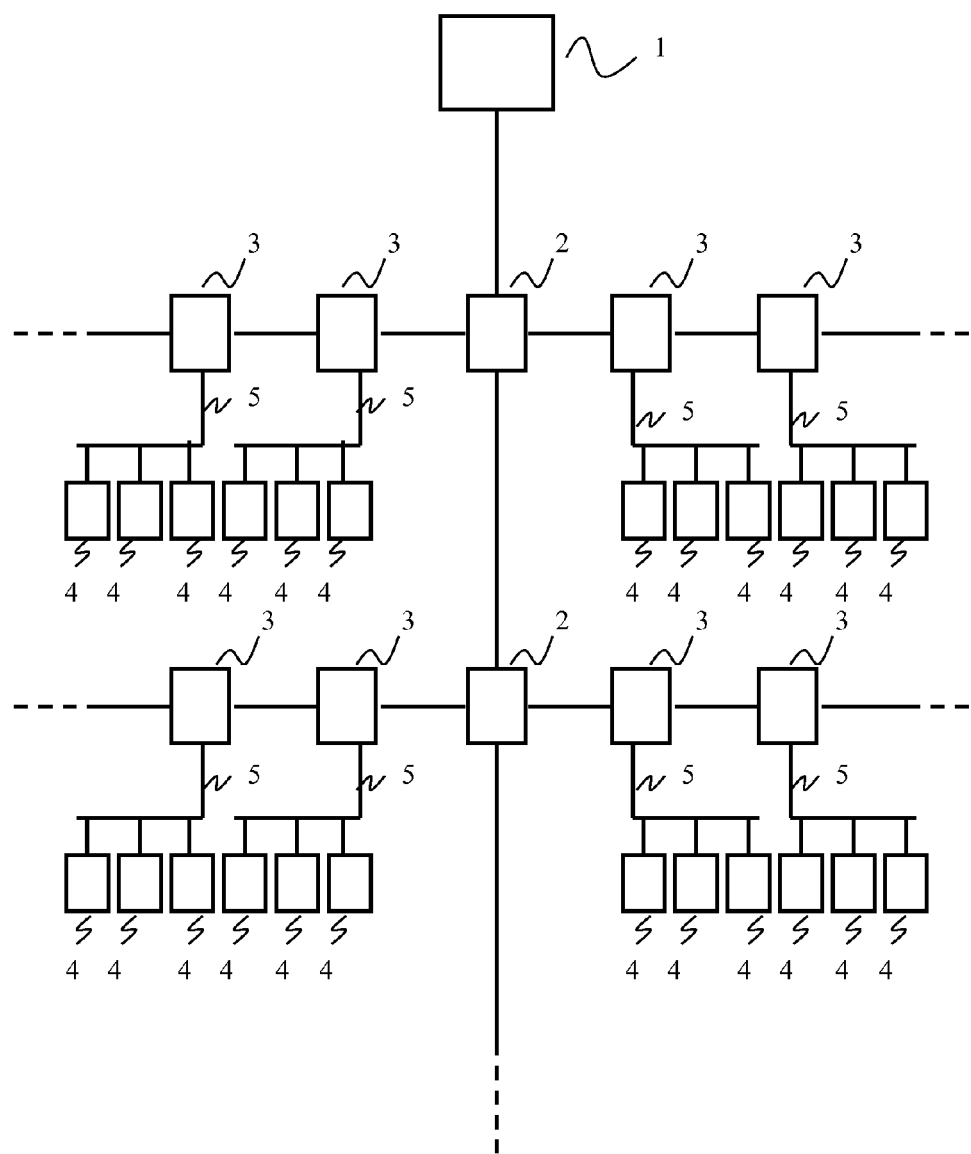
FIG. 1 illustrates schematically a seismic data acquisition system according to a first known solution, based on the use of analog sensors.
Figure 2:
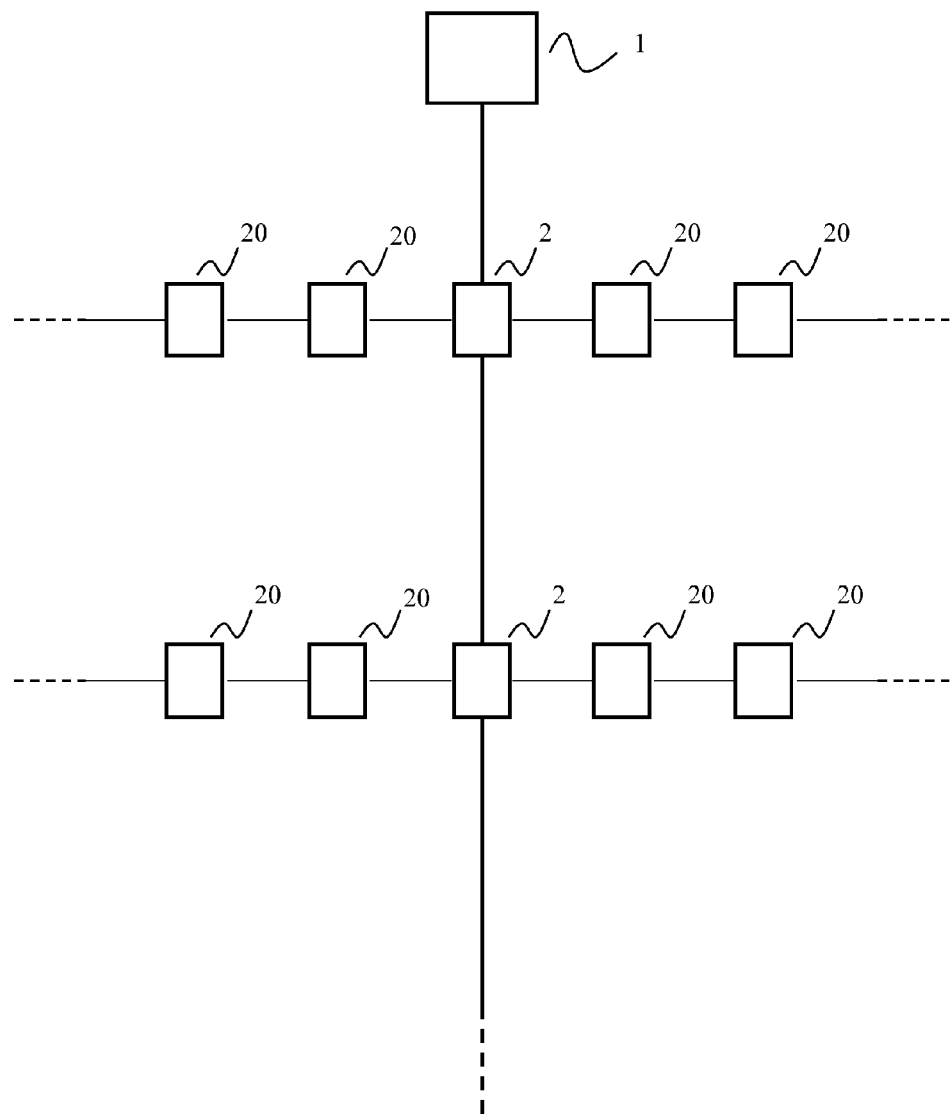
FIG. 2 illustrates schematically a seismic data acquisition system according to a second known solution, based on the use of digital sensors.

FIGS. 1, 2 and 6 relate to prior art and have already been discussed above.

Referring now to FIG. 3, we present a seismic data acquisition system according to a particular embodiment of the invention.

As in FIGS. 1 and 2, the seismic data acquisition system comprises a central recording system 1 (usually onboard a recording truck) and intermediate collection devices 2 ("concentrator devices").

As in FIG. 1, the system also comprises strings of sensors, but in FIG. 3 the sensors used are new digital sensors 31 (see description of FIG. 4 below).

For a best understanding of the present invention, each reference 31 designates a digital sensor and its corresponding housing and casing.

Each string of digital sensors 31 is connected, via a two-conductor line 5, to a new acquisition device 30, also referred to below as "new Digitizer Unit" (see description of FIG. 4 below).

In this particular embodiment, we have the following features:
- the string cable is a standard low cost/low quality two-conductor line 5 usually used to connect one or several analog geophones, as in FIG. 1 and not being designed to transmit high frequency digital data but low frequency analog data;
- the casing and the housing of each digital sensors 31 are identical to the casing 61 and the housing 62 of an analog sensor 4 (as illustrated in FIG. 6);
- the housing of each acquisition device 30 is identical to the housing of an acquisition device 3 in FIG. 1.

Thus, we use the well-proven string technique comprising a two-conductor line 5 (i.e. the cable of the string) and associated connectors.

In an alternative embodiment, at least one string comprises only one digital sensor 31 connected to an acquisition device 30 via a two-conductor line 5.

FIG. 4 details a string appearing in FIG. 3 and comprising two digital sensors 31 connected to an acquisition device 30, via a two-conductor line 5.

To simplify the FIG. 4, only one acquisition device 30 is shown, and the network between this acquisition device 30 and the central recording system 1 is not shown.

We detail now the structure of a digital sensor 31 and the structure of an acquisition device 30 according to this first embodiment.

The digital sensor 31 comprises:
- a MEMS-based accelerometer 311 (or any other digital sensing mean, e.g. a MEMS-based velocimeter or an analog geophone integrated with an analog/digital converter) providing seismic data. In a particular embodiment, the digital sensing mean 311 is a single component sensor. In an alternative embodiment, the digital sensing mean 311 is a three-component sensor;
- a local sampling clock 317 providing a sampling frequency to the MEMS-based accelerometer;
- a processor 312 (or CPU, for "Central Processing Unit"), and the associated memories (not shown: mad-only memory (ROM) and random access memory (RAM));
- a receiving block 315 for receiving the electrical power over the two-conductor line 5;
- a receiving block 313 for receiving:
    - command data coming from the acquisition device 30; and
    - synchronization information (like synchronization frame) providing accurate timing information to enable sensor synchronization, said synchronization information being received from the acquisition device 30 via said two-conductor line 5;
- a transmitting block 314 for transmitting at least the seismic data and quality control data towards the acquisition device 30;

a ADDLL block 316 ("all digital delay locked loop"), extracting a transmission clock from the received command data coming from the acquisition device 30;

a coupling block 318 for coupling the receiving blocks 313 and 315 and the transmitting block 314 to the two-conductor line 5. In a particular embodiment the coupling block 318 is suitable for a connection to the two-conductor line 5 according to a bus topology.

The coupling block 318 allows to multiple seismic data transmission, command data reception and electrical power on the same two-conductor line 5. In more details, the coupling block 318 comprises: a first capacitor (connected between a first conductor of the two-conductor line 5 and a first input of die receiving block 313 and a first output of the transmitting block 314), a second capacitor (connected between a second conductor of the two-conductor line 5 and a second input of the receiving block 313 and a second output of the transmitting block 314), a first inductor (connected between the first conductor of the two-conductor line 5 and a first input of the receiving block 315) and a second inductor (connected between the second conductor of the two-conductor line 5 and a second input of the receiving block 315).

The processor 312 implements the following additional functions:
compensating a drift of the local sampling clock 317; and
driving the receiving block 313 and the transmitting block 314, according to a half-duplex transmission protocol over the two-conductor line 5 and using the transmission clock extracted by the ADDLL block 316 from the received command data coming from the acquisition device 30.

In a particular embodiment, the function of drift compensation is adapted from the teaching of the U.S. Pat. No. 7,548,600 B2 in the name of Sercel.

In the present context, the MEMS-based accelerometer 311 comprises an analog/digital converter (not shown) sampling data at the sampling frequency provided by the local sampling clock 317, thus providing a series of sampled and dated seismic data having a time provided by the local sampling clock 317.

The processor 312, or a coprocessor (not shown), comprises:
a time-keeping module, for measuring the frequency error of the local sampling clock 317, the time-keeping module being able to gauge the local sampling clock to the synchronization frames (also called "reference clock"); and
a re-sampling module, for correcting the sampled and dated seismic data, as a function of a measured frequency error.

All implementation details relating to the time-keeping module and the re-sampling module can be found in the description and drawings of the aforesaid U.S. Pat. No. 7,548,600 B2.

In a particular embodiment, the function of driving the receiving clock 313 and the transmitting block 314, according to a half-duplex transmission protocol over the two-conductor line 5, is carried with any known half-duplex transmission protocol.

In an alternative embodiment, all the functions implemented by the processor 312 (see above discussions) can be implemented by a dedicated hardware machine or component such as an FPGA (Field Programmable Gate Array), an ASIC (Application-Specific Integrated Circuit) or any other hardware module (or any combination of several hardware modules). Any form combining a hardware portion and a software portion can also be used.

In the first embodiment illustrated in FIG. 4, the acquisition device 30 comprises:
a local clock 307;
an interfacing block 301 for interfacing with the network (i.e. an intermediate collection devices 2 ("concentrator devices") or another acquisition device);
a processor 302 (or CPU, for "Central Processing Unit"), and the associated memories (not shown; read-only memory (ROM) and random access memory (RAM));
a power supply block 305 for supplying the electrical power to the digital sensors 31, over the two-conductor line 5;
a receiving block 303 for receiving at least seismic data and quality control data coming from the digital sensors 31;
a transmitting block 304 for transmitting:
the command data towards the digital sensors 31; and
synchronization information (like synchronization frame) providing accurate timing information to enable sensor synchronization, said synchronization information being transmitted via the two-conductor line 5;
a ADDLL block 306 ("all digital delay locked loop"), extracting a transmission clock from the received bits contained in the data sent to the acquisition device 30 by the digital sensors 31;
a coupling block 308 (identical to coupling block 318 included in the digital sensor 31) for coupling the receiving blocks 303 and 305 and the transmitting block 304 to the two-conductor line 5. In a particular embodiment, the coupling block 308 is suitable for a connection to the two-conductor line 5 according to a bus topology.

The processor 302 implements the traditional functions of an acquisition device (e.g. processing of the seismic signal and interfacing with the digital network, i.e. transferring seismic data to the central recording system 1, receiving and processing commands received from the central recording system 1, etc).

The processor 302 also implements the following additional function: driving the receiving block 303 and the transmitting block 304, according to a half-duplex transmission protocol over die two-conductor line 5 and using the transmission clock extracted by the ADDLL block 306 (see above).

In a particular embodiment, the function of driving the receiving block 303 and the transmitting block 304, according to a half-duplex transmission protocol over the two-conductor line 5, is carried with any known half-duplex transmission protocol. If the string comprises several digital sensors 31 (case shown in FIG. 4), the half-duplex transmission protocol also manages a time division multiplexing (TDM) so as to share the access to the two-conductor line 5 among the acquisition device 30 and the digital sensors 31.

In an alternative embodiment, all the functions implemented by the processor 302 (see above discussions) can be implemented by a dedicated hardware machine or component such as an FPGA, an ASIC or any other hardware module (or any combination of several hardware modules.). Any form combining a hardware portion and a software portion can also be used.

FIG. 5 details an alternative embodiment of the acquisition device 50, to which can be connected either a string of digital sensors (not shown in FIG. 5, but identical to the ease shown in FIG. 4), or a string of analog sensors 51 (case shown in FIG. 5).

Analog sensors 51 are well-known and not described in detail here.

In this alternative embodiment, the acquisition device 50 differs from the one 30 of FIG. 4 in that it comprises an analog/digital converter 309 and a switching block 310 which selects the path for the data coming from the sensors, depending on the type of these sensors (analog or digital), and in that the processor 302 also implements an enabling/disabling function such that:

if the seismic sensors are of the analog type (case shown in FIG. 5):
the switching block 310 directs the data (coming from the analog sensors 51) towards the analog/dialog converter 309;
the analog/digital converter 309 is enabled, to convert the seismic data provided by the analog sensors 51 into digital seismic data;
the transmitting block 304 is disabled;
the power supply block 305 is disabled;
if the seismic sensors are of the digital type (case shown in FIG. 4):
the switching block 310 directs the data (coming from the digital sensors 31) towards the coupling block 308;
the analog/digital converter 309 is disabled;
the transmitting block 304 is enabled;
the driving function is enabled for driving the receiving block 303 and the transmitting block 304, according to a half-duplex transmission protocol over the two-conductor line 5 and using the transmission clock;
the power supply block 305 is enabled.

In a particular embodiment, the acquisition device 50 comprises means for automatically detecting whether a seismic sensor or a string of seismic sensors has been connected to the acquisition device via the two-conductor line, and means for automatically determine the type, analog or digital, of the seismic sensor or seismic sensors connected to the acquisition device.

At least one embodiment of the disclosure provides a technique for connecting one or several seismic digital sensors with an acquisition device, using a two-conductor line usually used to connect one or several seismic analog sensors, even though this two-conductor line is a poor quality cable.

An embodiment provides a technique of this kind allowing to use the existing cable (two-conductor line) of the known strings, by replacing, in mechanical housing of analog sensors, these analogs by digital sensors. Thus, the cost of development of such a technique is low (no new mechanical housing development is necessary).

In other words, at least one embodiment provides a digital sensor having a compactness which allows to place it in a housing containing usually an analog sensor.

An embodiment provides a technique of this kind allowing to reduce the power consumption of the acquisition device.

The invention claimed is:

1. A seismic data acquisition system comprising:
a first digital seismic sensor;
a second digital seismic sensor;
a two-conductor line connecting the first digital sensor to the second digital seismic sensor; and
a seismic acquisition device connected to the two-conductor line,
wherein the first and second digital seismic sensors send seismic data to the seismic acquisition device along the two-conductor line,
the seismic acquisition device sends power to the first and second digital seismic sensors along the two-conductor line, and
the first digital seismic sensor comprises:
a digital accelerometer that measures the seismic data;
a local sampling clock that generates a sampling frequency for the digital accelerometer;
a receiver configured to receive, along the two-conductor line, synchronization information providing timing information to enable first digital seismic sensor synchronization and also configured to receive command data from the acquisition device;
a transmitter that transmits the seismic data, along the two-conductor line, to the acquisition device;
a processor that drives the receiver and the transmitter, according to a half-duplex transmission protocol over the two-conductor line, and compensates, as a function of the synchronization information, a drift of the local sampling clock;
a power unit that receives power over the two-conductor line; and
a coupling unit that connects the power unit, receiver and transmitter to the two-conductor line.

2. The system of claim 1, wherein the seismic acquisition device sends commands to the first and second digital seismic sensors along the two-conductor line.

3. The system of claim 1, wherein the first digital seismic sensor is one of a MEMS-based accelerometer, MEMS-based velocimeter and an analog geophone integrated with an analog/digital converter.

4. The system of claim 1, wherein the coupling unit comprises:
two capacitors connected between the two-conductor line and the receiver and transmitter; and
two inductors connected between the two-conductor line and the power unit.

5. The system of claim 1, wherein the digital accelerometer comprises:
an analog-to-digital converter sampling the seismic data at the sampling frequency provided by the local sampling clock, thus providing a series of sampled and dated seismic data having a time provided by the local sampling clock,
and wherein the processor comprises:
a time-keeping module that measures a frequency error of the local sampling clock, the time-keeping module gauging the local sampling clock to the synchronization information, and
a re-sampling module that corrects the sampled and dated seismic data, as a function of the measured frequency error.

6. The system of claim 1, further comprising:
an all digital delay locked loop that extracts a transmission clock from the received command data.

7. The system of claim 1, wherein the first and second digital seismic sensors form a string of sensors attached to the seismic acquisition device.

8. The system of claim 1, wherein the seismic acquisition device is configured to be connected to a central unit for transmitting the seismic data.

9. The system of claim 1, wherein the seismic acquisition device comprises:

a local clock that generates a local time;
an interfacing block that interfaces with other seismic acquisition devices;
a processor;
a power supply block that supplies electrical power to the first and second digital seismic sensors over the two-conductor line;
a receiver that receives at least seismic data and quality control data from the first and second digital seismic sensors over the two-conductor line;
a transmitter that transmits command instructions to the first and second digital seismic sensors over the two-conductor line; and
an all digital delay locked loop that extracts a transmission clock from data received from first and second digital seismic sensors over the two-conductor line.

10. The system of claim 1, wherein each of the first and second digital seismic sensors has its own housing and each housing is identical to a housing of a corresponding analog seismic sensor.

11. A string of seismic data acquisition sensors comprising:
a first digital seismic sensor;
a second digital seismic sensor; and
a two-conductor line connecting the first digital sensor to the second digital seismic sensor,
wherein the first and second digital seismic sensors send digital seismic data along the two-conductor line, and the first and second digital seismic sensors receive power along the two-conductor line,
wherein the first digital seismic sensor comprises:
a digital accelerometer that measures the seismic data;
a local sampling clock that generates a sampling frequency for the digital accelerometer;
a receiver configured to receive, along the two-conductor line, synchronization information providing timing information to enable first digital seismic sensor synchronization and also configured to receive command data from an acquisition device;
a transmitter that transmits the seismic data, along the two-conductor line, to the acquisition device;
a processor that drives the receiver and the transmitter, according to a half-duplex transmission protocol over the two-conductor line, and compensates, as a function of the synchronization information, a drift of the local sampling clock;
a power unit that receives power over the two-conductor line; and
a coupling unit that connects the power unit, receiver and transmitter to the two-conductor line.

12. The string of sensors of claim 11, wherein one of the first and second digital seismic sensors sends the digital seismic data to a seismic acquisition device along the two-conductor line.

13. The string of claim 11, wherein the first digital seismic sensor is one of a MEMS-based accelerometer, MEMS-based velocimeter and an analog geophone integrated with an analog/digital converter.

14. The string of claim 11, wherein the digital accelerometer comprises:

an analog-to-digital converter sampling the seismic data at the sampling frequency provided by the local sampling clock, thus providing a series of sampled and dated seismic data having a time provided by the local sampling clock,
and wherein the processor comprises:
a time-keeping module that measures a frequency error of the local sampling clock, the time-keeping module gauging the local sampling clock to the synchronization information, and
a re-sampling module that corrects the sampled and dated seismic data, as a function of the measured frequency error.

15. A method for collecting seismic data, the method comprising:
deploying a string including first and second digital seismic sensors connected to each other with a two-conductor line;
connecting the first and second digital seismic sensors to a seismic acquisition device through the two-conductor line;
collecting analog seismic data with the string;
digitizing the analog seismic data in each of the first and second digital seismic sensors; and
transmitting the digitized seismic data to the seismic acquisition device along the two-conductor line,
wherein the first digital seismic sensor comprises:
a digital accelerometer that measures the seismic data;
a local sampling clock that generates a sampling frequency for the digital accelerometer;
a receiver configured to receive, along the two-conductor line, synchronization information providing timing information to enable first digital seismic sensor synchronization and also configured to receive command data from an acquisition device;
a transmitter that transmits the seismic data, along the two-conductor line, to the acquisition device;
a processor that drives the receiver and the transmitter, according to a half-duplex transmission protocol over the two-conductor line, and compensates, as a function of the synchronization information, a drift of the local sampling clock;
a power unit that receives power over the two-conductor line; and
a coupling unit that connects the power unit, receiver and transmitter to the two-conductor line.

16. The method of claim 15, further comprising:
sending power from the seismic acquisition device to the first and second digital seismic sensors along the two-conductor line.

17. The method of claim 15, further comprising:
sending commands from the seismic acquisition device to the first and second digital seismic sensors along the two-conductor line.

18. The method of claim 15, wherein the first digital seismic sensor is one of a MEMS-based accelerometer, MEMS-based velocimeter and an analog geophone integrated with an analog/digital converter.

* * * * *